United States Patent
Stark

(10) Patent No.: US 8,997,886 B2
(45) Date of Patent: Apr. 7, 2015

(54) CULTIVATOR WITH TWO ROWS OF DISCS IN DIRECTION OF TRAVEL

(75) Inventor: Crister Stark, Väderstad (SE)

(73) Assignee: Vaderstad-Verken Aktiebolag, Vaderstad (SE)

( * ) Notice: Subject to any disclaimer, the term of this patent is extended or adjusted under 35 U.S.C. 154(b) by 0 days.

(21) Appl. No.: 13/499,294

(22) PCT Filed: Sep. 22, 2010

(86) PCT No.: PCT/SE2010/051016
§ 371 (c)(1),
(2), (4) Date: Jun. 11, 2012

(87) PCT Pub. No.: WO2011/040863
PCT Pub. Date: Apr. 7, 2011

(65) Prior Publication Data
US 2012/0241182 A1    Sep. 27, 2012

(30) Foreign Application Priority Data
Oct. 1, 2009  (SE) ........................................ 0901262

(51) Int. Cl.
*A01B 5/00*    (2006.01)
*A01B 21/08*    (2006.01)
*A01B 23/04*    (2006.01)

(52) U.S. Cl.
CPC .............. *A01B 21/08* (2013.01); *A01B 23/046* (2013.01)

(58) Field of Classification Search
USPC ......... 172/574, 579, 581, 582, 584, 585, 586, 172/587, 593, 594, 595, 596, 676
See application file for complete search history.

(56) References Cited

U.S. PATENT DOCUMENTS 876,145 A  *  1/1908  Buchet et al. .................. 172/569
1,364,943 A  *  1/1921  McAdam ...................... 172/587
(Continued)

FOREIGN PATENT DOCUMENTS

CA            1144-413 A      4/1983
DE       202004028159 U1      4/2005
(Continued)

OTHER PUBLICATIONS

European Search Report dated Oct. 25, 2013.

*Primary Examiner* — Matthew D Troutman
(74) *Attorney, Agent, or Firm* — Birch, Stewart, Kolasch & Birch, LLP

(57) ABSTRACT

An agricultural machine (101; 201; 301) comprising two mainly parallel, in the direction of travel, cross-running disc implement rows (102a, 102c; 202a, 202b; 304a, 304b), wherein the orientation of the disc implements (102b, 102d; 203a, 203b; 302a, 302b) contained in the mentioned disc implement rows is arranged so that the fore row (102a; 202a; 304a) has disc implements that are mounted on a frame beam (110; 211; 303) and that are angled outwards and backwards towards the sides of the machine and in a dividing line mainly parallel to the direction of travel of the machine form a first point of change (208a, 304c), and the rear row (102c, 202b; 304b) has disc implements (102d; 203b; 302b) that are mounted on a frame beam (110; 211; 303) and that are angled inwards and backwards from the sides of the machine and in the dividing line form a second point of change (208b, 304a), wherein the fore row is adapted to throw soil from the first point of change outwards towards the sides of the machine and the other row is adapted to throw soil from the sides of the machine inwards towards the second point of change. The dividing line with the first point of change (208a, 304c), and with the second point of change (208b, 304) is arranged at a predetermined distance from the centre line of the machine (101; 201; 301) across the direction of travel.

12 Claims, 3 Drawing Sheets

(56) References Cited

U.S. PATENT DOCUMENTS

| | | | | |
|---|---|---|---|---|
| 1,432,143 | A | * | 10/1922 | White .......................... 172/315 |
| 1,884,273 | A | * | 10/1932 | Sandeen ...................... 172/187 |
| 1,944,275 | A | * | 1/1934 | Sandeen ...................... 172/429 |
| 2,352,963 | A | * | 7/1944 | McMahon ................... 172/451 |
| 4,366,760 | A | * | 1/1983 | Dreyer ......................... 111/194 |
| 4,542,793 | A | * | 9/1985 | Dietrich, Sr. ................. 172/180 |
| 5,259,460 | A | * | 11/1993 | Evers ........................... 172/576 |
| 5,458,203 | A | * | 10/1995 | Evers ........................... 172/569 |
| 6,158,523 | A | * | 12/2000 | Gengler et al. ............... 172/574 |

FOREIGN PATENT DOCUMENTS

| | | |
|---|---|---|
| EP | 1310144 A2 | 5/2003 |
| EP | 1 449 419 A1 | 8/2004 |
| GB | 585993 | 3/1947 |
| GB | 862469 | 10/1960 |
| GB | 2345627 A | 7/2000 |
| WO | WO 2004/004438 A1 | 1/2004 |
| WO | WO 2008/033091 A2 | 3/2008 |
| WO | WO 2008/033091 A2 | 8/2008 |

* cited by examiner

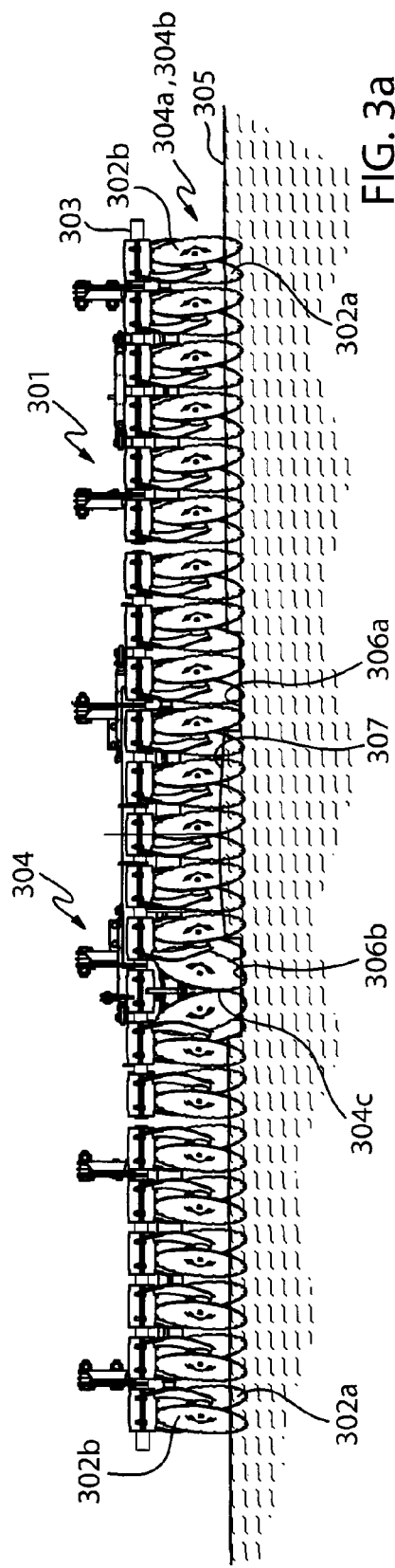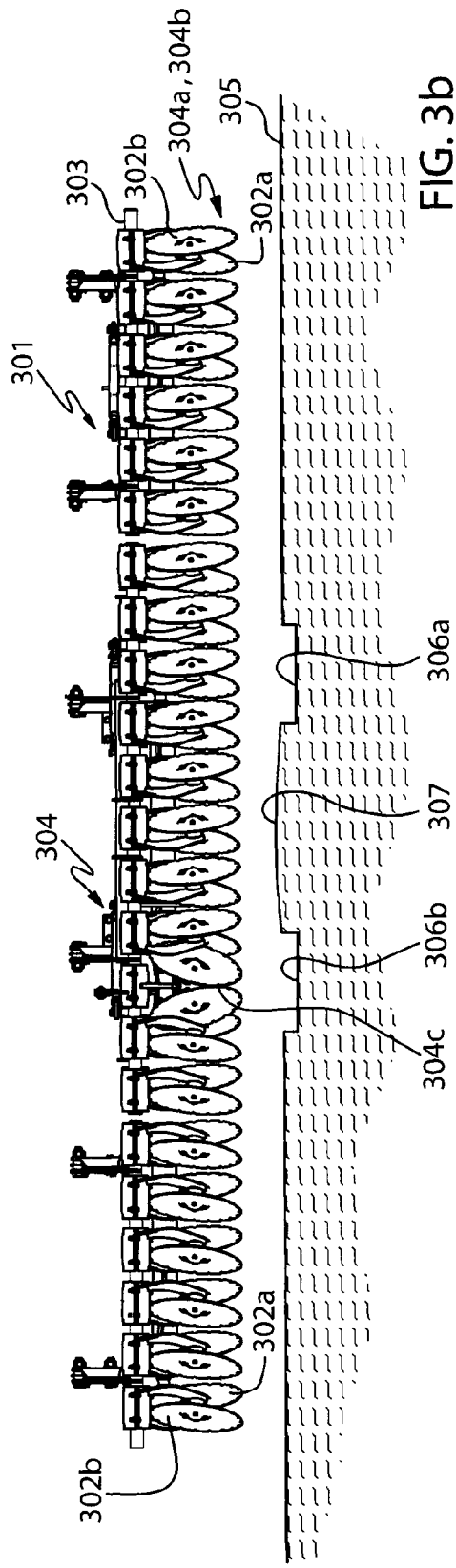

CULTIVATOR WITH TWO ROWS OF DISCS IN DIRECTION OF TRAVEL

The present invention refers to a device at an agricultural machine comprising one frame structure with two mainly parallel, in the direction of travel cross-running disc implement rows.

FIELD OF THE INVENTION

For a long time different forms of disc implement have been produced for soil cultivation. A disc implement has oblique discs to cultivate the soil. Some types of machine only have discs as working members, which are commonly orientated on a fore and a rear frame beam. Other machines can have discs on two rows arranged within a combination machine that while the machine is cultivating the soil with discs are designed for other tasks, for example deep loosening of the soil or simultaneous sowing.

The frame beams can be obliquely positioned and freely rotatable. The discs there can be rigidly connected with the frame beams. Another type of machine has two parallel carrying frame beams and discs that are mounted on arms, where every arm bears one or two discs and, in exceptional cases, more. The arms are commonly mounted recoilably at the bearing frame beams.

DESCRIPTION OF RELATED ART

Virtually all disc implements are constructed in what is called V-shape or X-shape. V-shape (see SE-C-520 059) means that all discs on the first frame beam are orientated in one direction and all discs on the rear frame beam are orientated in the opposite direction. X-shape (see SE-C-530 920) means that the machine is constructed with half the number of discs on a frame beam orientated in one direction and half the number of discs orientated in the other direction. On the other frame beam the same is done but the discs are orientated in the other direction, i.e. this type of machine is constructed mainly symmetrically, the machines are usually not perfectly symmetrical since account must be taken of soil flow, best possible excision (i.e. virtually all the soil is cultivated). Both types have their advantages and disadvantages. It is very important for the user that the machine leaves a very level soil surface, which is of significance for subsequent field operations such as harvesting. With a V-shaped arrangement it is easier to get a flat surface behind the machine, but it is difficult to get such a machine to run straight behind the tractor. The machine's discs tend to drive the machine in the lateral direction, where the lateral forces of the fore discs are balanced by the rear discs. This functions in theory but in practice it is more complicated, for example because the discs of the different frame beams work in soil with different degrees of cultivation. The fore row's discs, which break up the soil, work in harder conditions than the back row discs which run in soil that is partly broken up. The machine readily swings slightly to the side, i.e. it runs obliquely or unstably. In order to resolve this problem, the machine can be constructed with X-shape. The X-shape has the advantage that the machine usually runs stably behind the tractor. It is easier for an X-shaped machine to go straight, since the lateral forces of the discs more directly balance each other. It often runs straighter and more stably than a machine constructed in V-shape. On the other hand, this type of machine is often more costly to construct since it can easily become more complicated.

Another problem with X-built disc implements is that it is difficult to get uniform excision in the centre while it is also difficult to get the soil level (flat) behind the machine, since a ridge or trough tends to form in the direction of travel of the machine. For a long time there have been attempts to solve this problem by compensating the position and/or slicing angle of the discs in the centre of the machine.

The object of the present invention is to provide a device at an agricultural machine of the initially mentioned type, which device solves the abovementioned problem.

This object is achieved with a device at an agricultural machine, wherein the orientation of the disc implements contained in the said disc implement rows is arranged so that the fore row has disc implements that are mounted on a frame beam and that are angled outwards and backwards towards the sides of the machine and in a dividing line mainly parallel to the direction of travel of the machine form a first point of change, and the rear row has disc implements that are mounted on a frame beam and that are angled inwards and backwards from the sides of the machine and in the dividing line form a second point of change, wherein the fore row is adapted to throw soil from the first point of change outwards towards the sides of the machine and the other row is adapted to throw soil from the sides of the machine inwards towards the second point of change, and wherein the dividing line with the first point of change, and with the second point of change is arranged at a predetermined distance across the direction of travel from the centre line of the machine.

Preferred embodiments of the invention have been given the characteristics presented in the sub-claims.

Between the wheels of the tractor the soil is slightly raised, since the wheels of the tractor sink down into the ground and the soil often has a plastic consistency. That the soil is raised between the wheels means that the discs in the centre of the machine often work slightly deeper i.e. they displace more soil than other discs. It is naturally more difficult to get a good result behind the centre of the machine with regard to excision and levelness since the soil surface is elevated and more soil has to be handled here than at any other place in the machine. The situation for the discs that run in the tracks of the tractor wheels is the converse. They work with a smaller amount of soil.

Through moving the area where the direction of the discs is changed to in line with the tractor's wheel tracks the machine can be brought to give a better result as regards the condition of the soil surface behind the machine. This exploits the fact that the tractor's wheels virtually always make tracks where there is a smaller amount of soil to cultivate so that the function of the machine is improved. This is achieved through the soil level being lower due to the pressure exerted by the wheels. Through the device according to the invention the outcome is also that water does not remain standing in lower parts of the field, i.e. on both sides of a ridge or in the tractor's tracks. It is for reasons such as these that the farmer places great emphasis on getting fields level.

The area between the tractor wheels is normally approx. 1 m (internal dimensions), irrespective of the size of the tractor. This means that with the device according to the invention the point of change for both disc implement rows, where the reversed discs meet, is moved from the centre area of the machine to at least one half-meter in either direction. The points of change for the disc implement rows lie along a so-called dividing line that extends mainly parallel to the direction of travel of the machine. Through this displacement of the points of change/dividing line, the machine is still mainly X-shaped, the discs in the different rows, which tend to drive the machine to the side, still balance each other well.

This way of improving the ability of the machine to leave level fields can without major difficulty be incorporated into machines and this can be done without any extra material costs.

BRIEF DESCRIPTION OF THE DRAWINGS

The invention is described in greater detail in the following with reference to the attached drawings, which show preferred embodiments.

FIGS. 3a and 3b show a view from the rear of a second embodiment of an agricultural machine with a device according to the invention in the lowered position and raised transport position, respectively. Further details have been omitted for the sake of clarity.

DETAILED DESCRIPTION OF THE INVENTION

Figure 1:
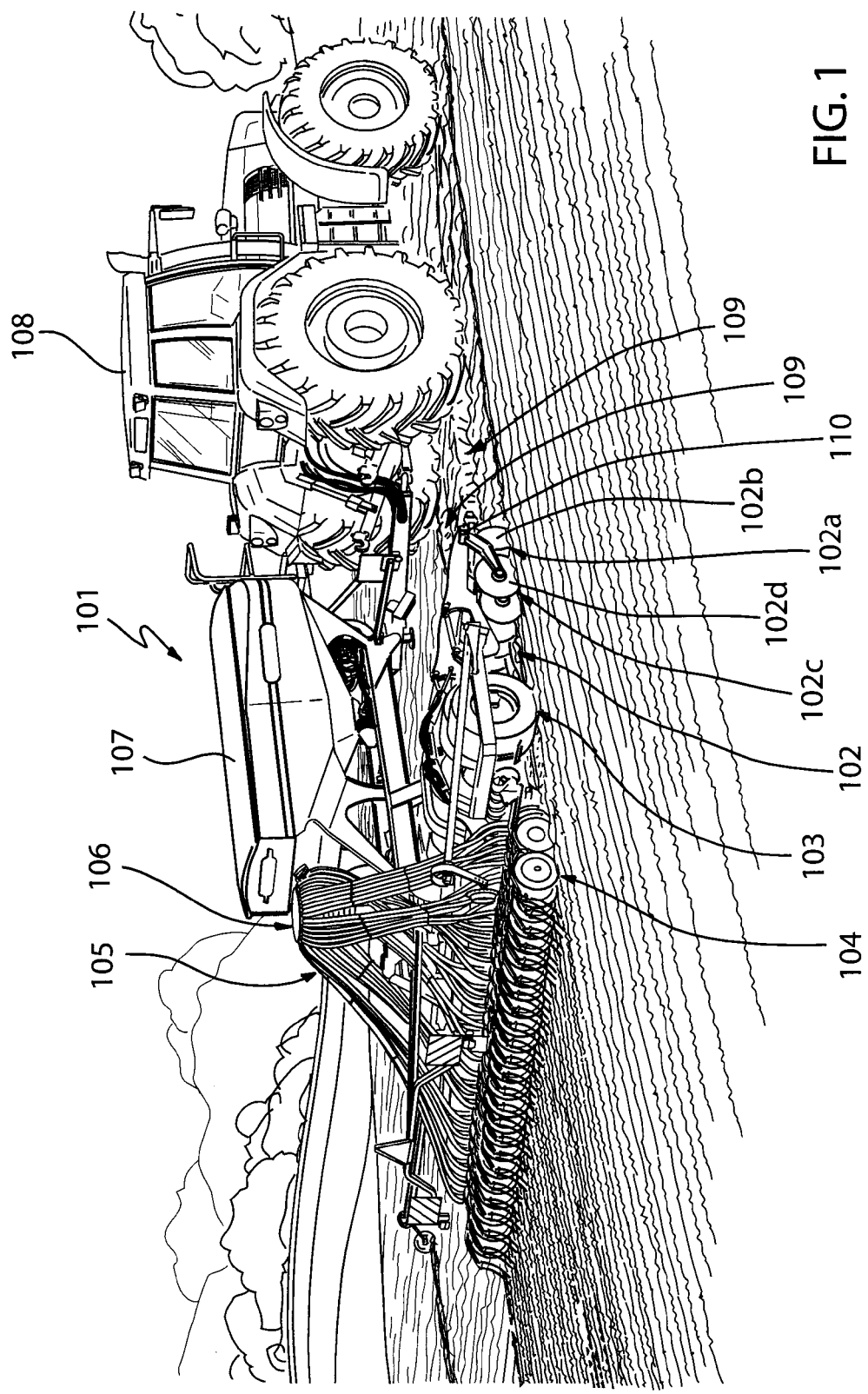
FIG. 1 shows a perspective view obliquely from the rear of a by a tractor drawn agricultural machine with a device according to the invention.
Figure 2:
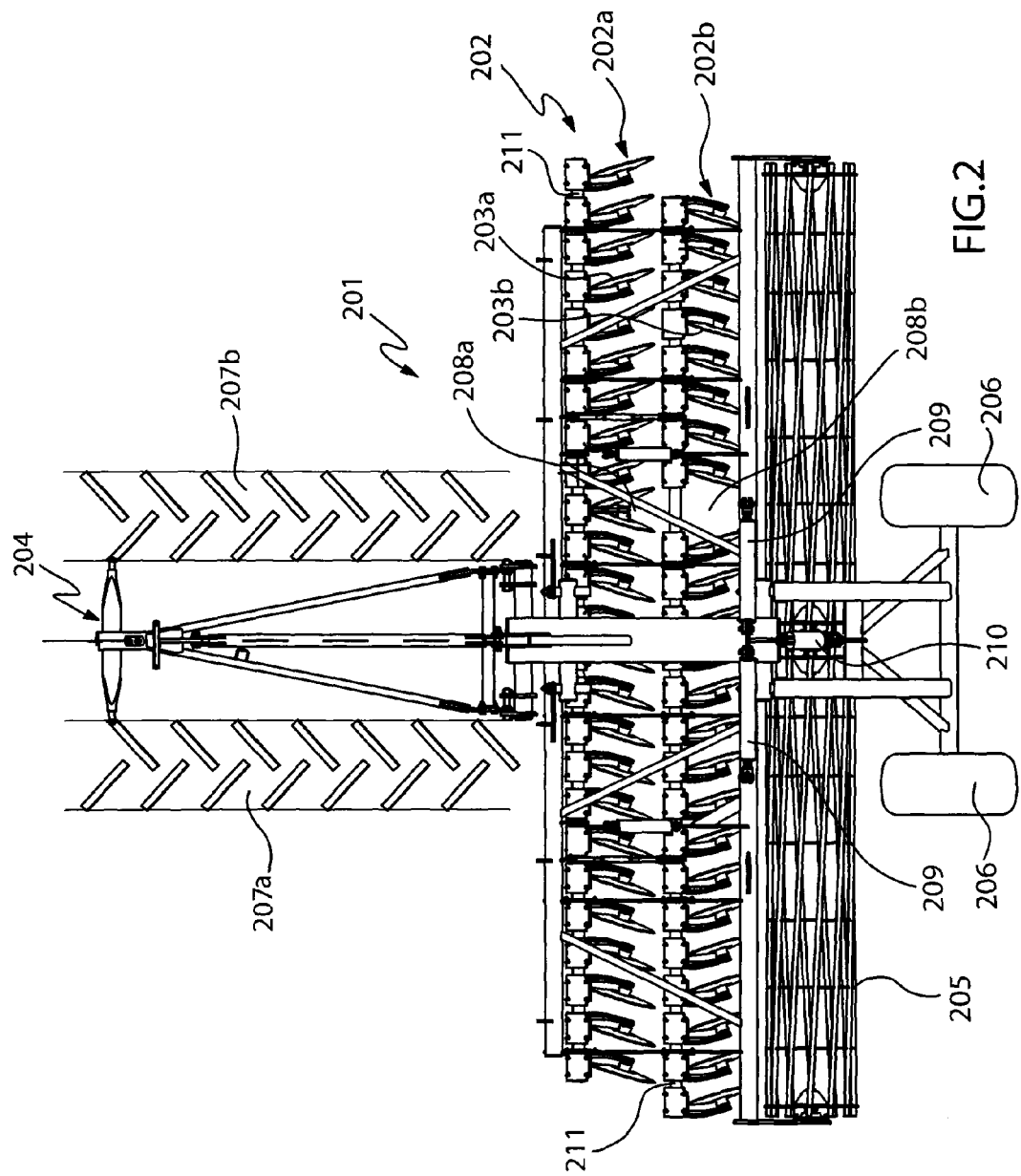
FIG. 2 shows a planar view of a first embodiment of an agricultural machine with a device according to the invention.

FIG. 1 illustrates an agricultural machine 101 for soil cultivation and sowing with a device 102 according to the invention. The device 102 according to the invention comprises a frame structure with discs arranged in X-shape, i.e. where the fore row 102a has discs 102b angled outwards towards the side of the machine and the rear row 102c has discs 102d that are angled inwards from the side of the machine. The agricultural machine 101 also has wheels 103 for transport and reconsolidation and sowing assemblies 104, which via flexible hoses 105, are linked to a distributor device 106, which in its turn is connected to a container 107 for seed or other granules, such as fertiliser. The agricultural machine 101 is drawn by a draught vehicle, such as a tractor 108. One can here at 109 clearly discern the tracks of the tractor, which are particularly troublesome on light soils that are to be cultivated. The discs are mounted on arms which in their turn are mounted recoilably on frame beams 110. With reference to FIGS. 2, 3a and 3b, below is given a presentation and more detailed description of the construction of the device according to the invention, which involves displaced points of change on the fore and rear rows 102a, 102c of discs 102b and 102d, resp., in an agricultural machine 101 of the type X-shape. The device according to the invention results in a level soil surface behind the machine.

FIG. 2 illustrates a first embodiment of an agricultural machine 201 with a device 202 according to the invention. The device 202 according to the invention comprises a frame structure with discs 203a and 203b arranged in X-shape, i.e. where the fore row 202a has discs 203a angled outwards towards the side of the machine and the rear row 202b has discs 202b, which are angled inwards from the side of the machine. This machine has rotatable frame beams. The discs 203a and 203b in the disc implement rows 202a and 202b resp. are suspended in frame beams with rubber elements in order to be able to recoil for example on impacts with stones. This agricultural machine 201 is intended for soil cultivation and comprises in addition to the device according to the invention a towing device 204, which can be coupled to a draught vehicle, such as a not shown tractor, a ribbed roller 205 for consolidation and working depth control arranged behind the discs 203a, 203b and wheels 206 for transport. This machine 201 can have not shown, rotatable frame beams, on which the discs 203a, 203b are mounted. Tractor tracks 207a and 207b are indicated and as can be seen in FIG. 2 the discs 203a, 203b are reversed at the points of change 208a and 208b in the two disc implement rows 202a and 202b in the righthand wheel track 207b. With reference to FIG. 2 the discs 203a, 203b are angled so that the discs 203a in the fore disc implement row 202a throw soil to the right on the right of the point of change 208a and to the left on the left of the point of change 208a, while the discs 203b in the rear disc implement row 202b throw soil to the left on the right of the point of change 208b and to the right on the left of the point of change 208b, so that the discs 203a in the fore disc implement row 202a are adapted to throw soil from the first point of change 208a outwards to the sides of the machine and the discs 203b in the rear disc implement row 202b are adapted to throw soil from the sides of the machine inwards towards the second point of change. Naturally one can within the framework of the following sub-claims allow both the points of change 208a and 208b to be arranged mainly in line with the lefthand wheel track 207a instead.

Hydraulic aggregates 209 are arranged on the machine 201 in order to lower and raise the sides of the agricultural machine 201 to a working position and a transport position, resp. A hydraulic aggregate 210 is adapted to lower and raise the agricultural machine 201 to a working position and a transport position, resp. The discs 203a, 203b are mounted on arms which in their turn are mounted recoilably on frame beams 211.

FIGS. 3a and 3b show a second embodiment of an agricultural machine 301 with a device 304 according to the invention. This diagram shows soil cultivating fore discs 302a, which are mounted on arms which in their turn are recoilably mounted on frame beams 303. The discs 302b on the rear row are visible. Other details have been omitted for the sake of clarity. In order to clarify the device 304 according to the invention, the disc implements 302a and 302b in FIG. 3b have been lifted up from the soil surface to a transport position in order to more clearly show the profile of the soil surface. In this alternative the frame beams are not rotatable. The disc implement rows 302a and 302b of the agricultural machine 301 can be raised and lowered at altered working depth or raised to an appropriate clearance height for turning in the field or for road transport. Both disc implement rows 304a and 304b, which turn, i.e. change orientation, at the point of change 304c, are arranged behind each other in the direction of travel and in FIGS. 3a and 3b the rear disc implement row 304b is obscured by the fore disc implement row 304a. The soil surface is marked here with a line 305 and the wheel tracks and the raised area between the wheel tracks are marked with 306a, 306b and 307, resp. It can be seen here that the discs 302a and 302b change orientation at the point of change 304c in the righthand tractor track 306b in the direction of travel (i.e. the lefthand tractor track in FIGS. 3a and 3b). Outside the wheel tracks 306a and 306b the soil surface is generally flat. It can be seen in FIG. 3a that the discs 304a, 304b work at different depths in different parts of the soil surface 305.

In order to adjust the discs 102b, 102d, 203a, 203b, 302a, 302b of the different disc implement rows 102a, 102c, 202a, 202b, 304a, 304b relative to each other so that as level a surface as possible is obtained behind the machine, the discs on the rear frame beam 110, 211, 303 on either side of the second point of change 208b, 304c are arranged so that they are displaceable towards each other or apart from each other along the frame beam 110, 211, 303.

Furthermore both the discs 102b, 203a and 302a in the fore disc implement row 102a, 202a and 304a resp., which viewed from above are mounted in essentially V-shape with the tip of the V pointing in the direction of travel, can be somewhat displaced in the direction of travel relative to each other, preferably approx. 2-5 cm. Through this the discs 102b, 203a and 303a in the mentioned V-shape can also be so displaced towards each other in the lateral direction that they slightly overlap each other. This gives better cultivation of the soil surface at the tip of the abovementioned V.

In the embodiment presented is shown a number of implements, but this number can be both increased and decreased within the framework of the following sub-claims. The hydraulic aggregates shown in the drawings can be any known adjustment apparatus or power apparatus whatsoever. The implements behind the discs can be other than those shown in the drawings or the discs can be the only implements on the agricultural machine.

The device according to the invention can be modified within the framework of the attached claims.

The invention claimed is:

1. A device at an agricultural machine comprising one frame structure with two mainly parallel, in the direction of travel, cross-running disc implement rows,
   wherein the orientation of disc implements contained in the said disc implement rows is arranged so that
   the fore row has disc implements that are mounted on one linear frame beam and that are angled outwards and backwards towards the sides of the machine from a dividing line which is mainly parallel to the direction of travel of the machine and through a first point of change, wherein all of the disc implements of the fore row are fixedly arranged along a single line, and
   the rear row has disc implements that are mounted on one linear frame beam and that are angled inwards and backwards from the sides of the machine towards the dividing line which is through a second point of change, wherein the disc implements of the row are fixedly arranged along a line,
   wherein the fore row is adapted to throw soil from the first point of change outwards towards the sides of the machine and the rear row is adapted to throw soil from the sides of the machine inwards towards the second point of change,
   wherein
   the dividing line through the first point of change and the second point of change is arranged at a predetermined distance from a centre line through the centre along the length direction of each respective linear frame beam,
   wherein the predetermined distance is greater than zero and less al the distance from the dividing line to the end of the linear frame beam, and
   wherein the first point of change and the second point of change are arranged mainly in line with one wheel track of an appointed draught vehicle.

2. The device according to claim 1, wherein the first point of change and the second point of change are arranged at a distance that is greater than approximately one half-meter from the centre line across the direction of travel.

3. The device according to claim 1, wherein the first point of change and the second point of change are arranged mainly in line with one wheel track of an appointed draught vehicle.

4. The device according to claim 1, wherein the disc implements on either side of the second point of change are arranged so that they are displaceable towards each other or apart from each other along a frame beam.

5. The device according to claim 1, wherein the discs in the fore disc implement row, which viewed from above are mounted in essentially V-shape with the tip of the V pointing in the direction of travel, are arranged to be somewhat displaced in the direction of travel of the machine relative to each other.

6. The device according to claim 5, wherein said discs in the fore disc implement row can also be so displaced towards each other in the lateral direction that they overlap each other.

7. The device according to claim 2, wherein the disc implements on either side of the second point of change are arranged so that they are displaceable towards each other or apart from each other along a frame beam.

8. The device according to claim 3, wherein the disc implements on either side of the second point of change are arranged so that they are displaceable towards each other or apart from each other along a frame beam.

9. The device according to claim 2, wherein the discs in the fore disc implement row, which viewed from above are mounted in essentially V-shape with the tip of the V pointing in the direction of travel, are arranged to be somewhat displaced in the direction of travel of the machine relative to each other.

10. The device according to claim 3, wherein the discs in the fore disc implement row, which viewed from above are mounted in essentially V-shape with the tip of the V pointing in the direction of travel, are arranged to be somewhat displaced in the direction of travel of the machine relative to each other.

11. The device according to claim 4, wherein the discs in the fore disc implement row, which viewed from above are mounted in essentially V-shape with the tip of the V pointing in the direction of travel, are arranged to be somewhat displaced in the direction of travel of the machine relative to each other.

12. The device according to claim 5, wherein said displacement is approximately 2-5 cm.

* * * * *